United States Patent
Luo et al.

(10) Patent No.: US 8,891,446 B2
(45) Date of Patent: Nov. 18, 2014

(54) POWER CONTROL WITH CROSS-SUBFRAME ASSIGNMENT

(75) Inventors: Tao Luo, San Diego, CA (US); Wanshi Chen, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 13/103,843

(22) Filed: May 9, 2011

(65) Prior Publication Data

US 2011/0274064 A1    Nov. 10, 2011

Related U.S. Application Data

(60) Provisional application No. 61/333,059, filed on May 10, 2010.

(51) Int. Cl.
| | |
|---|---|
| *H04W 4/00* | (2009.01) |
| *H04W 52/14* | (2009.01) |
| *H04W 52/32* | (2009.01) |
| *H04L 5/00* | (2006.01) |

(52) U.S. Cl.
CPC .......... *H04W 52/146* (2013.01); *H04L 5/0007* (2013.01); *H04W 52/325* (2013.01)
USPC ........................................................ 370/328

(58) Field of Classification Search
None
See application file for complete search history.

(56) References Cited

U.S. PATENT DOCUMENTS

| 8,233,458 B2 * | 7/2012 | Ahn et al. ............... 370/335 |
| 2009/0117931 A1 * | 5/2009 | Shin et al. ............... 455/522 |

(Continued)

FOREIGN PATENT DOCUMENTS

| JP | 2011520335 A | 7/2011 |
| WO | WO-2009088335 A1 | 7/2009 |
| WO | WO-2009129698 A1 | 10/2009 |

OTHER PUBLICATIONS

Huawei: "LTE non-CA based HetNet support", 3GPP Draft; R1-101982, 3rd Generation Partnership Project (3GPP), Mobile Competence Centre ; 650, Route Des Lucioles ; F-06921 Sophia-Antipolis Cedex ; France, vol. RAN WG1, no. Beijing, china; 20100412, Apr. 6, 2010, XP050419319, [retrieved on Apr. 6, 2010].

(Continued)

*Primary Examiner* — Otis L Thompson, Jr.

(57) ABSTRACT

A method includes receiving a cross-subframe assignment in a first subframe, targeting a second subframe in which a transmission power control (TPC) command is to be applied. The method may also include adjusting transmit power in accordance with the TPC command during a third subframe, a predefined number of subframes after the first subframe. Another method includes receiving a cross-subframe assignment in a first subframe. The cross-subframe assignment targets a second subframe in which a first TPC command is to be applied. The method may also include receiving a nominal grant in the first subframe that targets an identified subframe to which a second TPC command is to be applied. The method may also include adjusting the transmit power according to the first TPC command, the second TPC command or a function of the first TPC command and the second TPC command during the second subframe or the identified subframe.

16 Claims, 7 Drawing Sheets

(56) References Cited

U.S. PATENT DOCUMENTS

| | | | |
|---|---|---|---|
| 2009/0180433 A1* | 7/2009 | Ahn et al. | 370/329 |
| 2010/0067496 A1* | 3/2010 | Choi | 370/336 |
| 2010/0285830 A1* | 11/2010 | Englund et al. | 455/522 |
| 2011/0038271 A1* | 2/2011 | Shin et al. | 370/252 |
| 2011/0038302 A1* | 2/2011 | Papasakellariou et al. | 370/315 |
| 2011/0080838 A1* | 4/2011 | Larsson et al. | 370/252 |
| 2011/0134746 A1* | 6/2011 | Liu et al. | 370/201 |
| 2011/0237292 A1* | 9/2011 | Fujii | 455/522 |
| 2011/0267994 A1* | 11/2011 | Pan et al. | 370/280 |
| 2012/0208583 A1* | 8/2012 | Chung et al. | 455/509 |
| 2013/0176953 A1* | 7/2013 | Stern-Berkowitz et al. | 370/329 |

OTHER PUBLICATIONS

International Search Report and Written Opinion—PCT/US2011/035971, ISA/EPO—Sep. 5, 2011.

Kyocera: "Interference Management for Control Channels in Outdoor Hotzone Scenario", 3GPP Draft; R1-102678_CCH_0UTH0T, 3rd Generation Partnership Project (3GPP), Mobile Competence Centre; 650, Route Des Lucioles; F-06921 Sophia-Antipolis Cedex; France, vol. RAN WGI, no. Montreal, Canada; 20100510, May 4, 2010, XP050419887, [retrieved on May 4, 2010].

Kyocera: "Range Expansion Performance and Interference Management for Control Channels in Outdoor Hotzone Scenario", 3GPP Draft; R1-102363 Re CCH_OUTHOT, 3rd Generation Partnership Project (3GPP), Mobile Competence Centre ; 650, Route Des Lucioles ; F-06921 Sophia-Antipolis Cedex ; France, vol. RAN WGI, no. Beijing, china; 20100412, Apr. 6, 2010, XP050419587, [retrieved on Apr. 6, 2010].

LG Electronics: "PUCCH TPC in multiple DL 1-18 grants", 3 GPP Draft; R1-102695 Multiple TPC in DL Grant, 3rd Generation Partnership Project (3GPP), Mobile Competence Centre; 650, Route Des Lucioles; F-06921 Sophia-Antipolis Cedex; France, vol. RAN WGI, no. Montreal, Canada; 20100510, May 4, 2010, XP050419902, [retrieved on May 4, 2010].

* cited by examiner

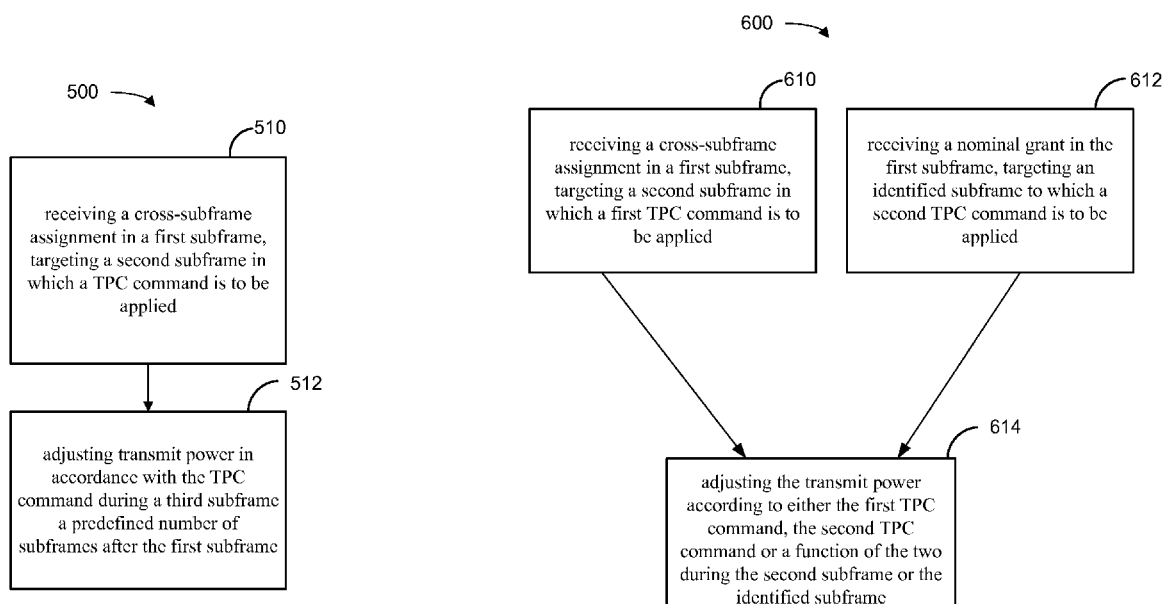

POWER CONTROL WITH CROSS-SUBFRAME ASSIGNMENT

CROSS-REFERENCE TO RELATED APPLICATION

This application claims the benefit under 35 U.S.C. §119(e) to U.S. Provisional Patent Application No. 61/333,059 entitled SYSTEMS AND METHODS FOR POWER CONTROL WITH CROSS-SUBFRAME ASSIGNMENT IN LONG TERM EVOLUTION-ADVANCED (LTE-A) NETWORKS, filed on May 10, 2010, the disclosure of which is expressly incorporated by reference herein in its entirety.

FIELD

Aspects of the present disclosure relate generally to wireless communication systems, and more particularly to power control with cross-subframe assignment in Long Term Evolution-Advanced networks.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities.

SUMMARY

According to some aspects of the disclosure, a method for communicating in a wireless network includes receiving a cross-subframe assignment in a first subframe. The cross-subframe assignment targets a second subframe in which a transmission power control (a.k.a., e.g., transmitter power control, transmit power control) (TPC) command is to be applied, where the second subframe differs from the first subframe. The method may also include adjusting transmit power in accordance with the TPC command during a third subframe. The third subframe may be a predefined number of subframes after the first subframe.

According to some aspects of the disclosure, a method for communicating in a wireless network includes receiving a cross-subframe assignment in a first subframe. The cross-subframe assignment targets a second subframe in which a first TPC command is to be applied, where the second subframe differs from the first subframe. The method may also include receiving a nominal grant in the first subframe. The nominal grant targets an identified subframe to which a second TPC command is to be applied, where the identified subframe differs from the first subframe. The method may also include adjusting the transmit power according to the first TPC command, the second TPC command or a function of the first TPC command and the second TPC command during the second subframe or the identified subframe.

According to some aspects of the disclosure, an apparatus for wireless communication includes means for receiving a cross-subframe assignment in a first subframe. The cross-subframe assignment targets a second subframe in which a TPC command is to be applied, where the second subframe differs from the first subframe. The apparatus may also include means for adjusting transmit power in accordance with the TPC command during a third subframe. The third subframe may be a predefined number of subframes after the first subframe.

According to some aspects of the disclosure, an apparatus for wireless communication includes means for receiving a cross-subframe assignment in a first subframe. The cross-subframe assignment targets a second subframe in which a first TPC command is to be applied where, the second subframe differs from the first subframe. The apparatus may also include means for receiving a nominal grant in the first subframe. The nominal grant targets an identified subframe to which a second TPC command is to be applied, where the identified subframe differs from the first subframe. The apparatus may also include means for adjusting the transmit power according to the first TPC command, the second TPC command or a function of the first TPC command and the second TPC command during the second subframe or the identified subframe.

According to some aspects of the disclosure, an apparatus for wireless communication includes a memory and at least one processor coupled to the memory. The at least one processor is configured to receive a cross-subframe assignment in a first subframe. The cross-subframe assignment targets a second subframe in which a TPC command is to be applied, where the second subframe differs from the first subframe. The at least one processor is also configured to adjust transmit power in accordance with the TPC command during a third subframe that is a predefined number of subframes after the first subframe.

According to some aspects of the disclosure, an apparatus for wireless communication includes a memory and at least one processor coupled to the memory. The at least one processor is configured to receive a cross-subframe assignment in a first subframe. The cross-subframe assignment targets a second subframe in which a first TPC command is to be applied, where the second subframe differs from the first subframe. The at least one processor is also configured to receive a nominal grant in the first subframe. The nominal grant targets an identified subframe to which a second TPC command is to be applied, where the identified subframe differs from the first subframe. The at least one processor is also configured to adjust the transmit power according to the first TPC command, the second TPC command or a function of the first TPC command and the second TPC command during the second subframe or the identified subframe.

According to some aspects of the disclosure, a computer program product for wireless communication in a wireless network includes a non-transitory computer-readable medium having program code recorded thereon. The program code includes program code to receive a cross-subframe assignment in a first subframe. The cross-subframe assignment targets a second subframe in which a TPC command is to be applied, where the second subframe differs from the first subframe. The program code also includes program code to adjust transmit power in accordance with the TPC command during a third subframe that is a predefined number of subframes after the first subframe.

According to some aspects of the disclosure, a computer program product for wireless communication in a wireless network includes a non-transitory computer-readable medium having program code recorded thereon. The program code includes program code to receive a cross-subframe assignment in a first subframe. The cross-subframe assignment targets a second subframe in which a first TPC command is to be applied, where the second subframe differs from the first subframe. The program code also includes program code to receive a nominal grant in the first subframe. The nominal grant targets an identified subframe to which a second TPC command is to be applied, where the identified subframe differs from the first subframe. The program code also includes program code to adjust the transmit power according to the first TPC command, the second TPC command or a function of the first TPC command and the second TPC command during the second subframe or the identified subframe.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5 is a block diagram illustrating a method for adjusting transmit power in a wireless communication system.

FIG. 6 is a block diagram illustrating a method for adjusting transmit power in accordance with a TPC command.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
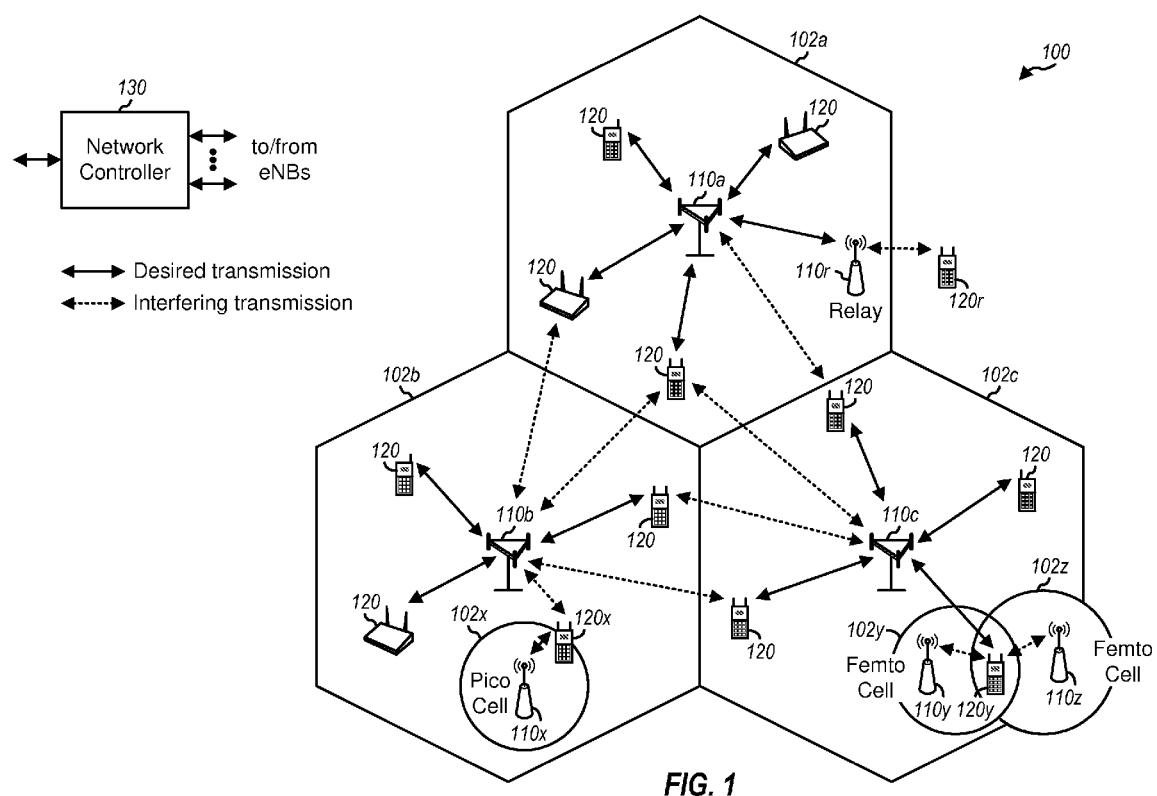
FIG. 1 is a block diagram conceptually illustrating an example of a telecommunications system.

FIG. 1 shows a wireless communication network 100, which may be an LTE-A network, in which power control with cross-subframe assignment may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. In addition, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y) are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a smart phone, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
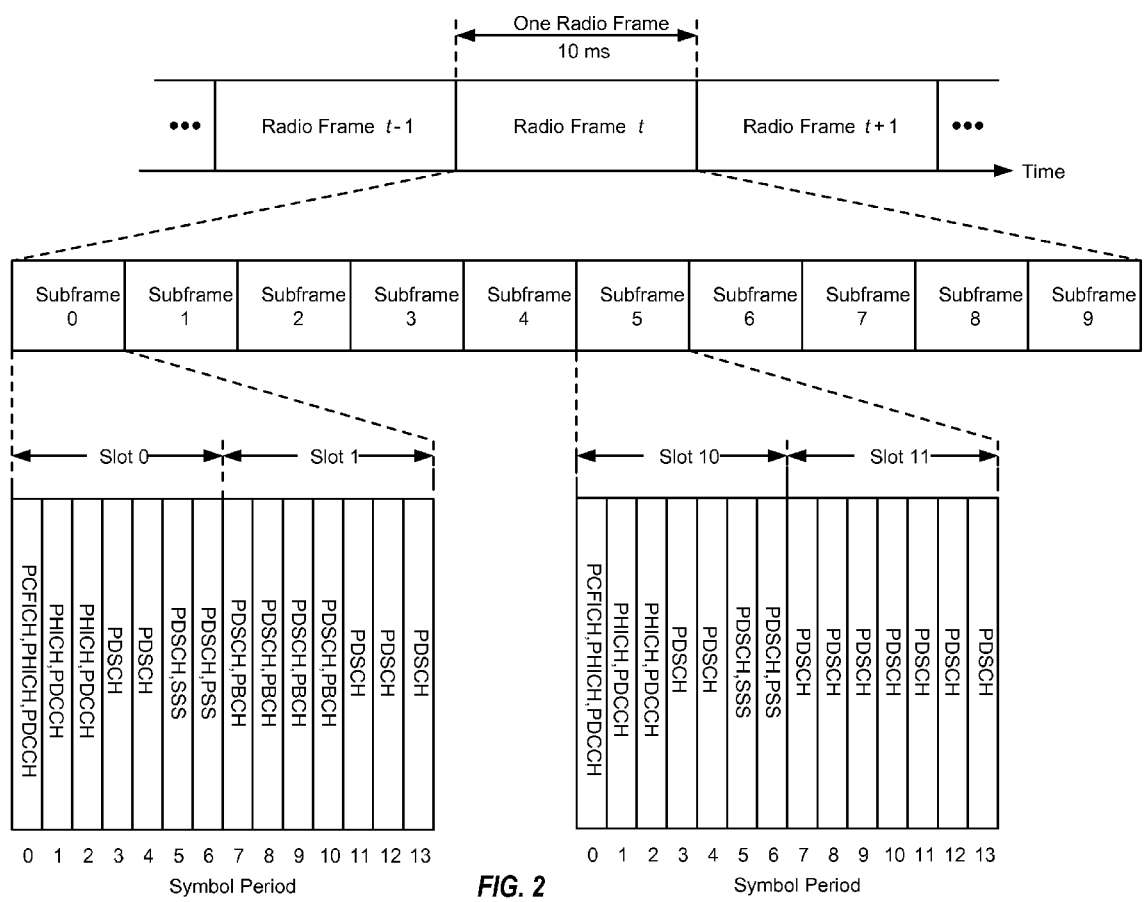
FIG. 2 is a diagram conceptually illustrating an example of a downlink frame structure in a telecommunications system.

FIG. 2 shows a downlink FDD frame structure used in LTE. Such a frame structure may include power control cross subframe assignments. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
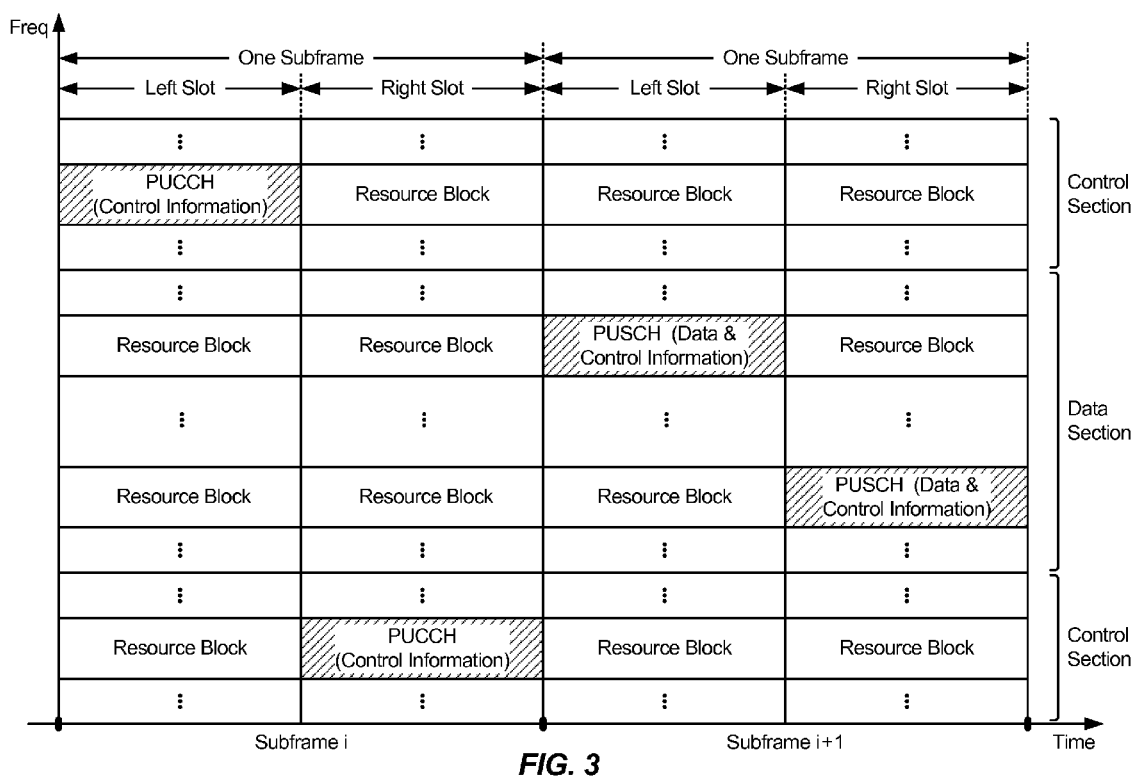
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. Power control for these uplink transmissions may be based on cross subframe assignments. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSS, SSS, CRS (Cell-specific reference signals), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
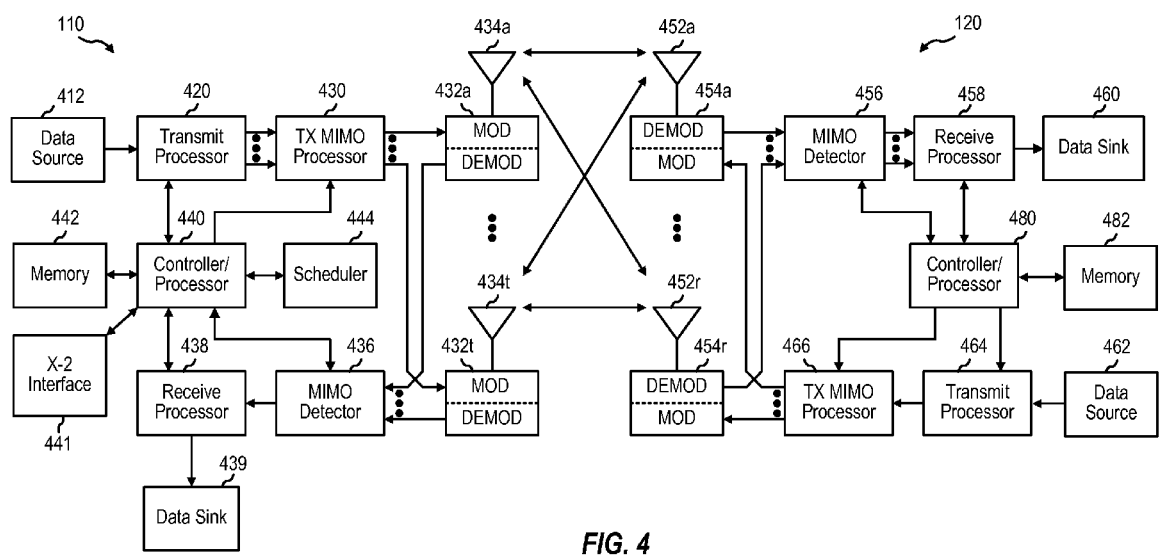
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*. The base station 110 may provide the power control commands for the UE 120.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 5, and/or other processes for the techniques described herein. The memories 442 and 482 may store data and program codes for the base station 110 and the UE 120, respectively. A scheduler 444 may schedule UEs for data transmission on the downlink and/or uplink.

In LTE and LTE-advanced systems, TPC commands for the Physical Uplink Shared Channel (PUSCH) may be received as part of an uplink (UL) grant. TPC commands may be two-bits indicating to a User Equipment (UE) how to adjust transmit power for the next transmission. TPC commands for the Physical Uplink Control Channel (PUCCH) may be received as part of a downlink (DL) grant. In addition, group power control grants may be received by the UE in Format 3/3A messages for controlling power on the PUSCH with PDCCH. When a TPC command is received at subframe n in a Frequency Division Duplex system, the power control may be applied to the PUSCH and/or PUCCH at subframe n+4.

Cross-subframe assignments are grants received at subframe n but used for decoding a data channel at a later subframe (e.g., subframe n+m, where m>0). A downlink (DL) grant received at subframe n may be used for Physical Data Shared Channel (PDSCH) decoding at subframe n+m, where m>0. An uplink (UL) grant received at subframe n may be used for Physical Uplink Shared Channel (PUSCH) transmission at subframe n+m+4, where m>0. Therefore, there may be a need to specify power control behavior for a UE to respond to TPC commands when there is a cross-subframe assignment. For example, in a cross-subframe assignment scenario there may be a need to determine when the UE should apply TPC commands carried in the cross-subframe assignment. In addition, there may be a need to determine how the UE should apply the TPC commands when there are multiple downlink grants.

In some aspects, TPC commands may be applied at a subframe that is a fixed offset from the subframe in which the UE receives the TPC command. Therefore, a TPC command received at subframe n may be applied by the UE at subframe n+4, regardless of the subframe targeted by cross-subframe assignment. For example, a UE receives a nominal grant targeting subframe 0 and the UE receives a cross-subframe grant targeting subframe 2. Although both the nominal grant and cross-subframe grant targeting subframe 2 are received in subframe 0, in this case, the TPC command is applied at subframe 4.

In some aspects, rather than applying the TPC commands a fixed offset from the subframe in which the UE receives the TPC command, the TPC command can be applied based on a HARQ interlace. For example, a HARQ interlace may include the timing relationship between different transmissions of a packet and the acknowledgements (e.g., ACK, NACK) for these transmissions. A payload of a cross-subframe assignment can target independent subframes, e.g., a decoding subframe and HARQ subframe. In some aspects, the TPC commands received in the cross-subframe assignment are applied to the first occurrence of the same HARQ interlace on or after subframe n+4. When a HARQ index targets a subframe 4 or fewer subframes later, the UE applies the TPC command to the subframe corresponding to the received HARQ index subframe+4. When a HARQ index targets a subframe greater than 4 frames after the cross-subframe assignment, the TPC command is applied to the subframe corresponding to the HARQ index.

Rather than applying the TPC commands a fixed offset from the subframe in which the UE receives the TPC command, in some aspects, TPC commands may be applied to a subframe a fixed offset from the subframe for which the cross-subframe is targeted. For example, when a UE receives a TPC command at subframe n, the UE applies the transmit power command at subframe n+k+4, where n+k is the subframe for which the cross-subframe assignments is targeted.

How the UE should apply the TPC commands when multiple downlink grants occur is also considered. A UE may receive multiple downlink or uplink grants in the same subframe. While some grants may be false alarms, other grants may be cross-subframe grants, resulting in overloaded TPC commands at the same subframe. For example, an eNodeB may send both a cross-subframe grant and a nominal grant to the UE.

In some aspects, when multiple downlink or uplink grants are received in the same subframe, all grants (regular (i.e., nominal) non-cross-subframe grants or cross-subframe grants) may be targeted for the same subframe. In this overloaded TPC command scenario, when all grants target the same subframe, the UE may select TPC bits from one of the multiple received grants. For example, in one aspect, the UE may select the TPC bits from the most recently received grant or from a non-cross-subframe assignment grant. In another aspect, the UE may apply combinations of the TPC commands received during the multiple grants. For example, the UE may sum the TPC commands and adjust power levels based on the sum. In another example, the UE may apply a minimum adjustment from the TPC commands received during the multiple grants. In a further example, the UE may apply a maximum adjustment from the TPC commands received during the multiple grants.

In some aspects, when multiple downlink or uplink grants are received in the same subframe, some grants may be targeted for a first subframe and other grants may be targeted for a second subframe. For example, a UE may receive a first grant targeted for subframe n and a second grant targeted for subframe m, where n does not equal m. In this overloaded TPC command scenario, the UE may select TPC bits from one of the multiple received grants. For example, in one aspect, the UE may select the TPC bits from the most recently received grant or from a non-cross-subframe assignment grant. In another aspect, the UE may apply combinations of the TPC commands received during the multiple grants. For example, the UE may sum the TPC commands and adjust power levels based on the sum. In another example, the UE may apply a minimum adjustment from the TPC commands received during the multiple grants. In a further example, the UE may apply a maximum adjustment from the TPC commands received during the multiple grants. In yet another aspect, the UE may use HARQ index information to determine when to apply TPC bits for the uplink and/or downlink grant. For example, the UE may apply TPC command from one grant based on the HARQ index to which the grant is targeted.

FIG. 5 is a block diagram illustrating a method for adjusting transmit power in a wireless communication system. The process 500 starts at block 510 where a cross-subframe assignment is received in a first subframe. The cross-subframe assignment targets a second subframe in which a TPC command is to be applied. The second subframe differs from the first subframe. At block 512, transmit power is adjusted in accordance with the TPC command during a third subframe that is a predefined number of subframes after the first subframe.

In one configuration, the UE 120 is configured for wireless communication including means for receiving the cross-subframe assignment in a first subframe. In one aspect, the receiving means may be the antenna 452a-r, demodulators 454a-r, receive processor 458, controller/processor 480, and/or memory 482 configured to perform the functions of the receiving means. The UE 120 is also configured to include a means for adjusting the transmit power. In one aspect, the adjusting means may be the controller/processor 480, and/or memory 482 configured to perform the functions of the adjusting means. In another aspect, the aforementioned means may be a module or any apparatus configured to perform the functions of the aforementioned means.

FIG. 6 is a block diagram illustrating a process 600 for adjusting transmit power in accordance with a TPC command. At block 610, a cross-subframe assignment is received in a first subframe. The cross-subframe assignment targets a second subframe in which a first TPC command is to be applied. The second subframe differs from the first subframe. At block 612, a nominal grant is received in the first subframe. The nominal grant targets an identified subframe to which a second TPC command is to be applied. The identified subframe differs from the first subframe. At block 614, the transmit power is adjusted according to the first TPC command, the second TPC command or a function of the first TPC command and the second TPC command during the second subframe or the identified subframe.

In one configuration, the UE 120 is configured for wireless communication including means for receiving the cross-subframe assignment in a first subframe. In one aspect, the receiving means may be the antenna 452a-r, demodulators 454a-r, receive processor 458, controller/processor 480, and/or memory 482 configured to perform the functions of the receiving means. The UE 120 is also configured to include a means for receiving a nominal grant in a first subframe. In one aspect, the receiving means for receiving a nominal grant may be the antenna 452a-r, demodulators 454a-r, receive processor 458, controller/processor 480, and/or memory 482 configured to perform the functions of the nominal grant receiving means. The UE 120 is also configured to include a means for adjusting the transmit power. In one aspect, the adjusting means may be the controller/processor 480, and/or memory 482 configured to perform the functions of the adjusting means. In another aspect, the aforementioned means may be a module or any apparatus configured to perform the functions of the aforementioned means.

Figure 7:
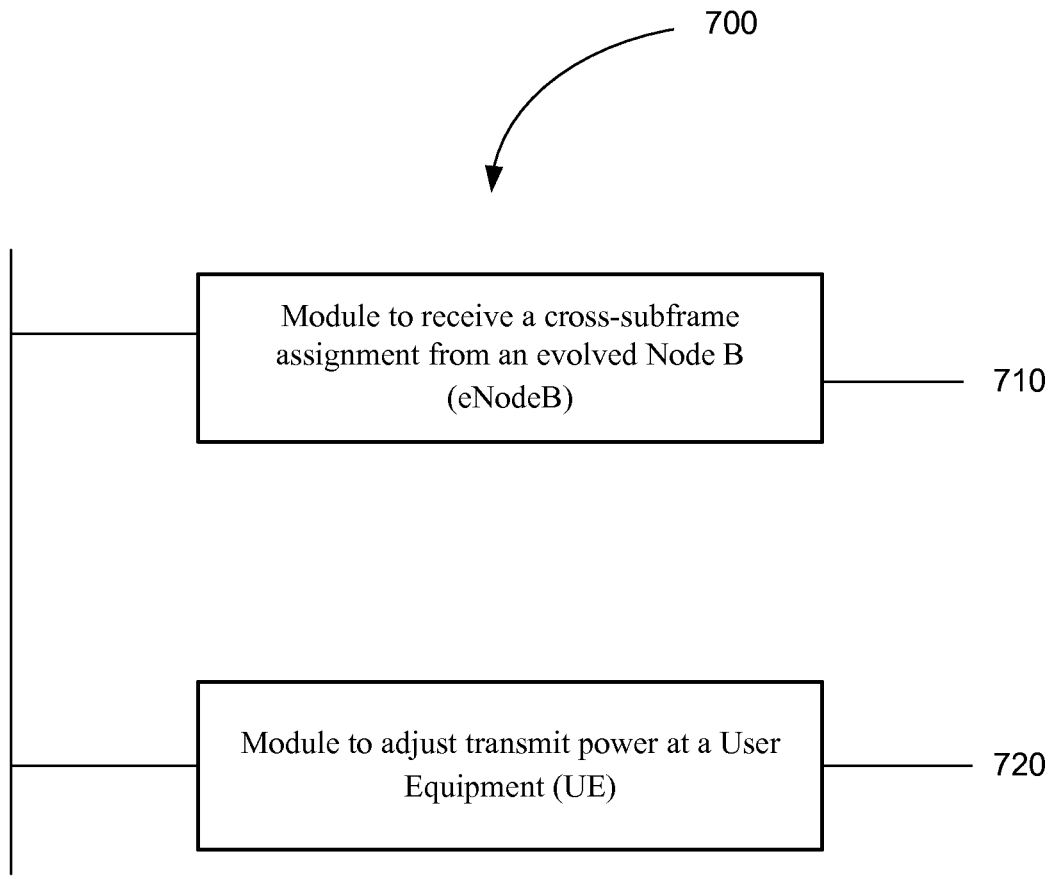
FIGS. 7 and 8 show exemplary apparatuses configured for adjusting transmit power in accordance with a TPC command.

FIG. 7 shows a design of an apparatus 700 for a UE, such as the UE 120 of FIG. 4. The apparatus 700 includes a module 710 for receiving a cross-subframe assignment in a first subframe, the cross-subframe assignment targeting a second subframe in which a TPC command is to be applied. The apparatus also includes a module 720 to configure a User Equipment (UE) to adjust transmit power in accordance with the TPC command during a third subframe a predefined number of subframes after the first subframe. The modules in FIG. 7 may include processors, electronics devices, hardware devices, electronics components, logical circuits, memories, software codes, firmware codes, etc., or any combination thereof.

Figure 8:
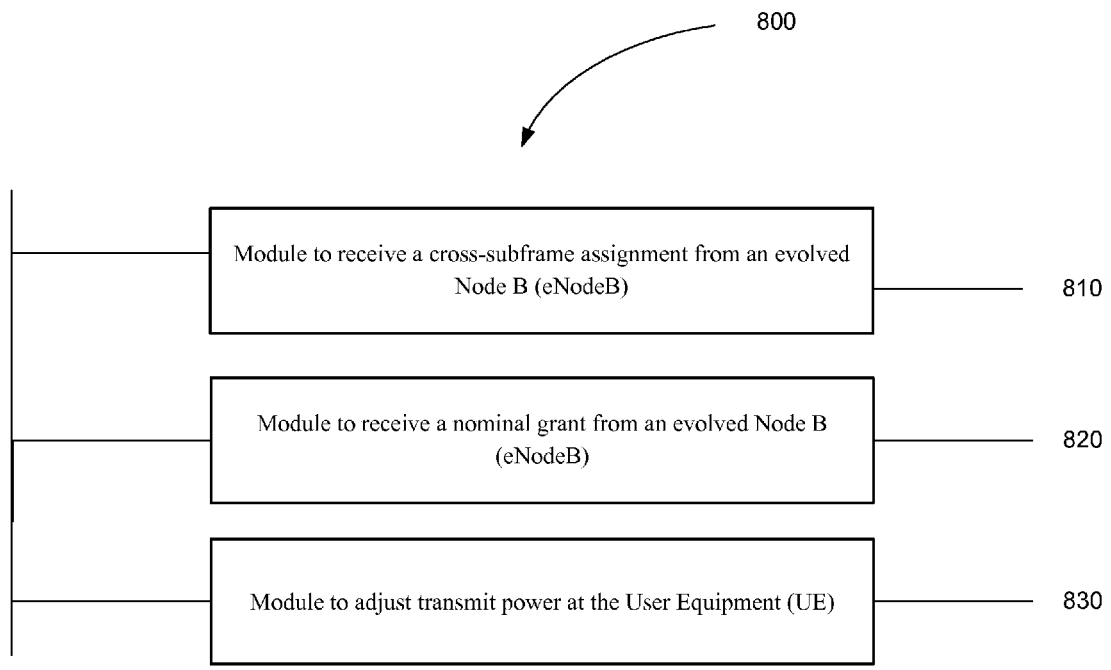

FIG. 8 shows a design of an apparatus 800 for a UE, such as the UE 120 of FIG. 4. The apparatus 800 includes a module 810 for receiving a cross-subframe assignment in a first subframe, the cross-subframe assignment targeting a second subframe in which a first TPC command is to be applied. The apparatus also includes a module 820 to configure a User Equipment (UE) to receive a nominal grant in the first subframe. The nominal grant targets an identified subframe to which a second TPC command is to be applied. The apparatus also includes a module 830 for adjusting the transmit power according to the first TPC command, the second TPC command or a function of the first TPC command and the second TPC command during the second subframe or the identified subframe. The modules in FIG. 8 may include processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, a conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a digital versatile disc (DVD), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. The functions, steps and/or actions of the claims in accordance with the aspects of the invention need not be performed in any particular order. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communicating in a wireless network, comprising:
    receiving a cross-subframe assignment in a first subframe, the cross-subframe assignment targeting a second subframe and including a transmission power control (TPC) command, the second subframe differing from the first subframe; and
    adjusting transmit power in accordance with the TPC command during a third subframe a predefined number of subframes after the first subframe, the third subframe being different than the second subframe.

2. The method of claim 1, in which the third subframe coincides with a Hybrid Automatic Repeat Request (HARQ) interlace associated with the first subframe.

3. The method of claim 1, in which the third subframe occurs a predefined number of subframes after the second subframe.

4. A method for communicating in a wireless network, comprising:
    receiving a cross-subframe assignment in a first subframe, the cross-subframe assignment comprising a grant for decoding a second subframe including a first transmission power control (TPC) command, the second subframe differing from the first subframe;
    receiving a nominal grant in the first subframe, the nominal grant targeting an identified subframe to which a second TPC command is to be applied, the identified subframe differing from the first subframe; and
    adjusting the transmit power according to one of the first TPC command, the second TPC command and a function of the first TPC command and the second TPC command during one of the second subframe and the identified subframe.

5. The method of claim 4, in which the identified subframe comprises the second subframe.

6. The method of claim 4, in which the identified subframe comprises a third subframe, different from the second subframe, and in which the third subframe coincides with a Hybrid Automatic Repeat Request (HARQ) interlace targeted by one of the first TPC command and the second TPC command.

7. An apparatus for wireless communication, comprising:
    means for receiving a cross-subframe assignment in a first subframe, the cross-subframe assignment targeting a second subframe and including a transmission power control (TPC) command, the second subframe differing from the first subframe; and
    means for adjusting transmit power in accordance with the TPC command during a third subframe a predefined number of subframes after the first subframe, the third subframe being different than the second subframe.

8. An apparatus for wireless communication, comprising:
    means for receiving a cross-subframe assignment in a first subframe, the cross-subframe assignment comprising a grant for decoding a second subframe including a transmission power control (TPC) command, the second subframe differing from the first subframe;
    means for receiving a nominal grant in the first subframe, the nominal grant targeting an identified subframe to which a second TPC command is to be applied, the identified subframe differing from the first subframe; and
    means for adjusting the transmit power according to one of the first TPC command, the second TPC command and a function of the first TPC command and the second TPC command during one of the second subframe and the identified subframe.

9. An apparatus for wireless communication, comprising:
    a memory; and
    at least one processor coupled to the memory, the at least one processor being configured to:
    receive a cross-subframe assignment in a first subframe, the cross-subframe assignment targeting a second subframe and including a transmission power control (TPC) command, the second subframe differing from the first subframe; and
    adjust transmit power in accordance with the TPC command during a third subframe a predefined number of subframes after the first subframe, the third subframe being different than the second subframe.

10. The apparatus of claim 9, in which the third subframe coincides with a Hybrid Automatic Repeat Request (HARQ) interlace associated with the first subframe.

11. The apparatus of claim 9, in which the third subframe occurs a predefined number of subframes after the second subframe.

12. An apparatus for wireless communication, comprising:
a memory; and
at least one processor coupled to the memory, the at least one processor being configured to:
receive a cross-subframe assignment in a first subframe, the cross-subframe assignment comprising a grant for decoding a second subframe including a transmission power control (TPC) command, the second subframe differing from the first subframe;
receive a nominal grant in the first subframe, the nominal grant targeting an identified subframe to which a second TPC command is to be applied, the identified subframe differing from the first subframe; and
adjust the transmit power according to one of the first TPC command, the second TPC command and a function of the first TPC command and the second TPC command during one of the second subframe and the identified subframe.

13. The apparatus of claim 12, in which the identified subframe comprises the second subframe.

14. The apparatus of claim 12, in which the identified subframe comprises a third subframe, different from the second subframe, and in which the third subframe coincides with a Hybrid Automatic Repeat Request (HARQ) interlace targeted by one of the first TPC command and the second TPC command.

15. A computer program product for wireless communication in a wireless network, comprising:
a non-transitory computer-readable medium having program code recorded thereon, the program code comprising:
program code to receive a cross-subframe assignment in a first subframe, the cross-subframe assignment targeting a second subframe and including a transmission power control (TPC) command, the second subframe differing from the first subframe; and
program code to adjust transmit power in accordance with the TPC command during a third subframe a predefined number of subframes after the first subframe, the third subframe being different than the second subframe.

16. A computer program product for wireless communication in a wireless network, comprising:
a non-transitory computer-readable medium having program code recorded thereon, the program code comprising:
program code to receive a cross-subframe assignment in a first subframe, the cross-subframe assignment comprising a grant for decoding a second subframe including a transmission power control (TPC) command, the second subframe differing from the first subframe;
program code to receive a nominal grant in the first subframe, the nominal grant targeting an identified subframe to which a second TPC command is to be applied, the identified subframe differing from the first subframe; and
program code to adjust the transmit power according to one of the first TPC command, the second TPC command and a function of the first TPC command and the second TPC command during one of the second subframe and the identified subframe.

\* \* \* \* \*